(12) United States Patent
Venables

(10) Patent No.: US 7,995,597 B2
(45) Date of Patent: Aug. 9, 2011

(54) METHOD AND SYSTEM FOR WEIGHTED FAIR QUEUING

(75) Inventor: Bradley D. Venables, Ottawa (CA)

(73) Assignee: Nortel Networks Limited, Mississauga, Ontario (CA)

(*) Notice: Subject to any disclaimer, the term of this patent is extended or adjusted under 35 U.S.C. 154(b) by 378 days.

(21) Appl. No.: 12/250,681

(22) Filed: Oct. 14, 2008

(65) Prior Publication Data

US 2010/0091783 A1 Apr. 15, 2010

(51) Int. Cl.
*H04L 12/28* (2006.01)
(52) U.S. Cl. .......... 370/412; 370/230; 370/395.43
(58) Field of Classification Search .......... 370/278, 370/238, 412, 468, 230, 395.43
See application file for complete search history.

(56) References Cited

U.S. PATENT DOCUMENTS

| | | | |
|---|---|---|---|
| 6,438,134 B1 * | 8/2002 | Chow et al. | 370/412 |
| 6,683,884 B1 * | 1/2004 | Howard | 370/412 |
| 6,862,265 B1 | 3/2005 | Appala et al. | |
| 7,187,684 B2 | 3/2007 | Goetzinger et al. | |
| 7,373,420 B1 * | 5/2008 | Lyon | 709/235 |
| 7,539,199 B2 * | 5/2009 | Shrimali et al. | 370/395.42 |
| 7,706,386 B2 * | 4/2010 | Ma et al. | 370/395.42 |
| 2005/0141424 A1 * | 6/2005 | Lim et al. | 370/235 |

FOREIGN PATENT DOCUMENTS

WO 02062013 A2 8/2002

OTHER PUBLICATIONS

International Search Report dated Jan. 4, 2010 for International Application Serial No. PCT/CA2009/001450, International Filing Date Oct. 13, 2009 consisting of 20-pages.

* cited by examiner

*Primary Examiner* — Ricky Ngo
*Assistant Examiner* — Dewanda Samuel
(74) *Attorney, Agent, or Firm* — Christoper & Weisberg P.A.

(57) ABSTRACT

A system for scheduling data for transmission in a communication network includes a credit distributor and a transmit selector. The communication network includes a plurality of children. The transmit selector is communicatively coupled to the credit distributor. The credit distributor operates to grant credits to at least one of eligible children and children having a negative credit count. Each credit is redeemable for data transmission. The credit distributor further operates to affect fairness between children with ratios of granted credits, maintain a credit balance representing a total amount of undistributed credits available, and deduct the granted credits from the credit balance. The transmit selector operates to select at least one eligible and enabled child for dequeuing, bias selection of the eligible and enabled child to an eligible and enabled child with positive credits, and add credits to the credit balance corresponding to an amount of data selected for dequeuing.

17 Claims, 11 Drawing Sheets

METHOD AND SYSTEM FOR WEIGHTED FAIR QUEUING

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for weighted fair queuing in the presence of rate-shaped traffic, and more specifically to a method and system providing weighted fair queuing for frame-based traffic which allows integration of rate limits and rate guarantees to children competing within the weighted fair queue scheduler.

BACKGROUND OF THE INVENTION

Every computer and communication network which transfers data packets must implement some form of scheduling to insure that data traffic progresses through the network at a particular rate. At any given moment, a network may have hundreds of thousands or even millions of connections containing data queues waiting for transport through the network. Some form of scheduling is required to enable network elements to process these data queues in a fair and timely manner.

Typically, schedulers interact with the data queues to schedule the transmission of data through the network. Schedulers can be hierarchical in that the selected child also could be a scheduler which must choose from its children. The scheduler determines the order of data transmission from eligible data queues or other eligible child schedulers having data available. Generally, a separate process enqueues the data to a queue, but the separate process is coupled to scheduling in the way it announces the data availability or child eligibility. Schedulers periodically, or on request, choose a child with available data from which to transmit the data. The hierarchical scheduler establishes a transmission of data from the selected queue.

FIG. 1 illustrates a prior art data system 10 that includes a scheduling process 12 wherein the data path includes a series of data queues 14a, 14b, 14c, 14d and 14e (collectively referenced as data queue 14) and multiplexers 16a, 16b (collectively referenced as multiplexer 16). Although shown in FIG. 1 as a physical unit, in a typical scalable implementation, the multiplexers do not physically exist, but are implied by the scheduler's choice of data queue 14 for transmission. The scheduling process 12 may select from any of the data queues 14 having data available ("DA"); however, due to hierarchical nature of the implementation, the scheduling process 12 must request a child scheduler 18 to select from data queue 14d and data queue 14e. The child scheduler 18 then selects the appropriate data queue 14d, 14e. In this example, the scheduling process 12 may select data queues 14a, 14b and 14c directly.

One prior art weighted fair queuing process is disclosed in U.S. Pat. No. 7,373,420, issued to Lyon (hereinafter "the '420 Patent"), the entire contents of which are herein incorporated by reference. FIG. 2 illustrates the weighted fair queuing process of the '420 Patent, which includes an inverse credit management system that uses the assigned weights for each data queue to determine which queue to credit. Basically, the weighted fair queuing with inverse credit management ("WFQ-ICM") scheduler 20 includes two complimentary processes: a WFQ credit distributor 22 and a transmit selector 24. The transmit selector 24 typically operates in a round-robin fashion, wherein each child with data available and positive credit takes a turn at transmitting data.

The credit process 22 grants credits to children whose current credits are less than the amount of data available ("ADA") for that child. The amount of credits each child has accrued at any given time is tracked in a child credit state database 26. The amount of credits per child never exceeds that child's ADA. If at any time, a child has less credit than its ADA, it is included in the credit distributor 22 where it competes for more credit.

The transmit selector 24 selects children with positive credit counts to transmit data. When a child transmits data, credits are decremented from its current credit amount in the child credit state database 26 and returned to the credit distributor 22 for redistribution to other children having ADA greater than number of credits. The credit distributor 22 gives credits at the same rate as children spend credits (i.e., there is no outstanding balance), thus a key requirement of the WFQ-ICM scheduler 20 is that the system needs to know exactly how much data is available for transmission from each child at all times. This requirement prevents a child from deeming itself ineligible when it still has data available, rendering implementation of overlaying processes to determine eligibility based on rate practically impossible. Fundamentally, rate limits can force a child with data to stop transmitting or have no data available to the parent scheduler. This limitation also carries a heavy burden on hierarchical schedulers where ADA includes all descendant queues, no matter how many levels of hierarchy are involved—effectively coupling scheduling processes between scheduling levels.

Therefore, what is needed is a method, system and apparatus for weighted fair queuing with inverse credit management that may be used in the presence of rate-shaped traffic.

SUMMARY OF THE INVENTION

The present invention advantageously provides a method and system for scheduling data for transmission in a communication network based on child eligibility and credit distribution. Generally, a scheduler for weighted fair queuing with inverse credit management may be used in the presence of rate-shaped traffic, allowing for integration of rate limits and rate guarantees to children competing within the weighted fair queue scheduler.

In accordance with one aspect of the present invention, a system for scheduling data for transmission in a communication network includes a credit distributor and a transmit selector. The communication network includes a plurality of children. The transmit selector is communicatively coupled to the credit distributor. The credit distributor operates to grant credits to at least one of eligible children and children having a negative credit count. Each credit is redeemable for data transmission. The credit distributor further operates to maintain a credit balance representing a total amount of undistributed credits available, affect fairness between children with ratios of granted credits, and deduct the granted credits from the credit balance. The transmit selector operates to select at least one eligible and enabled child for dequeuing, bias selection of the eligible and enabled child to an eligible and enabled child with positive credits, and add credits to the credit balance corresponding to an amount of data selected for dequeuing.

In accordance with another aspect of the present invention, a method is provided for distributing credits to children in a communication network. Each credit is redeemable for an amount of data transmission. Credits are granted to at least one of eligible, enabled children and children having a negative credit count. A credit balance that represents a total amount of undistributed credits available is maintained and the granted credits are deducted from the credit balance.

In accordance with yet another aspect of the present invention, a method is provided for scheduling data for transmission in a communication network. The communication network includes a plurality of children. A plurality of transmit control queues are established for dequeuing. Each transmit control queue is capable of containing at least one identifier of a corresponding eligible child and has a priority level defined according to a corresponding credit count requirement. Each eligible child is assigned to one of the plurality of transmit control queues. Each eligible child has a credit state that meets the credit count requirement for its assigned transmit control queue. At least one eligible child is selected for dequeuing according to the priority level of the transmit control queue corresponding to the eligible child. Credits corresponding to an amount of data dequeued are added to the credit balance. Each eligible and enabled child is represented in one of the transmit control queues.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
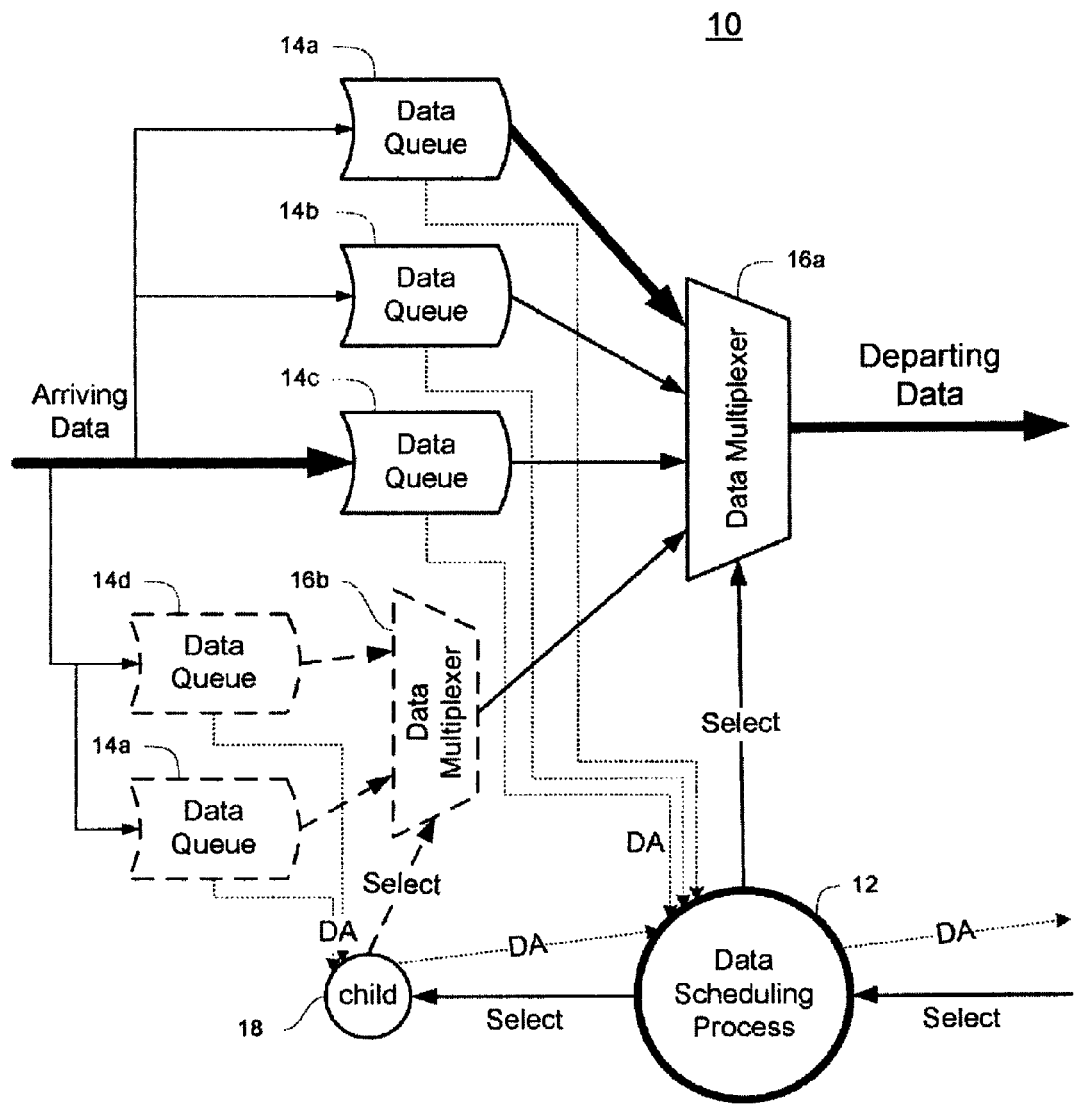
FIG. 1 is a block diagram of an exemplary prior art data scheduling process.
Figure 2:
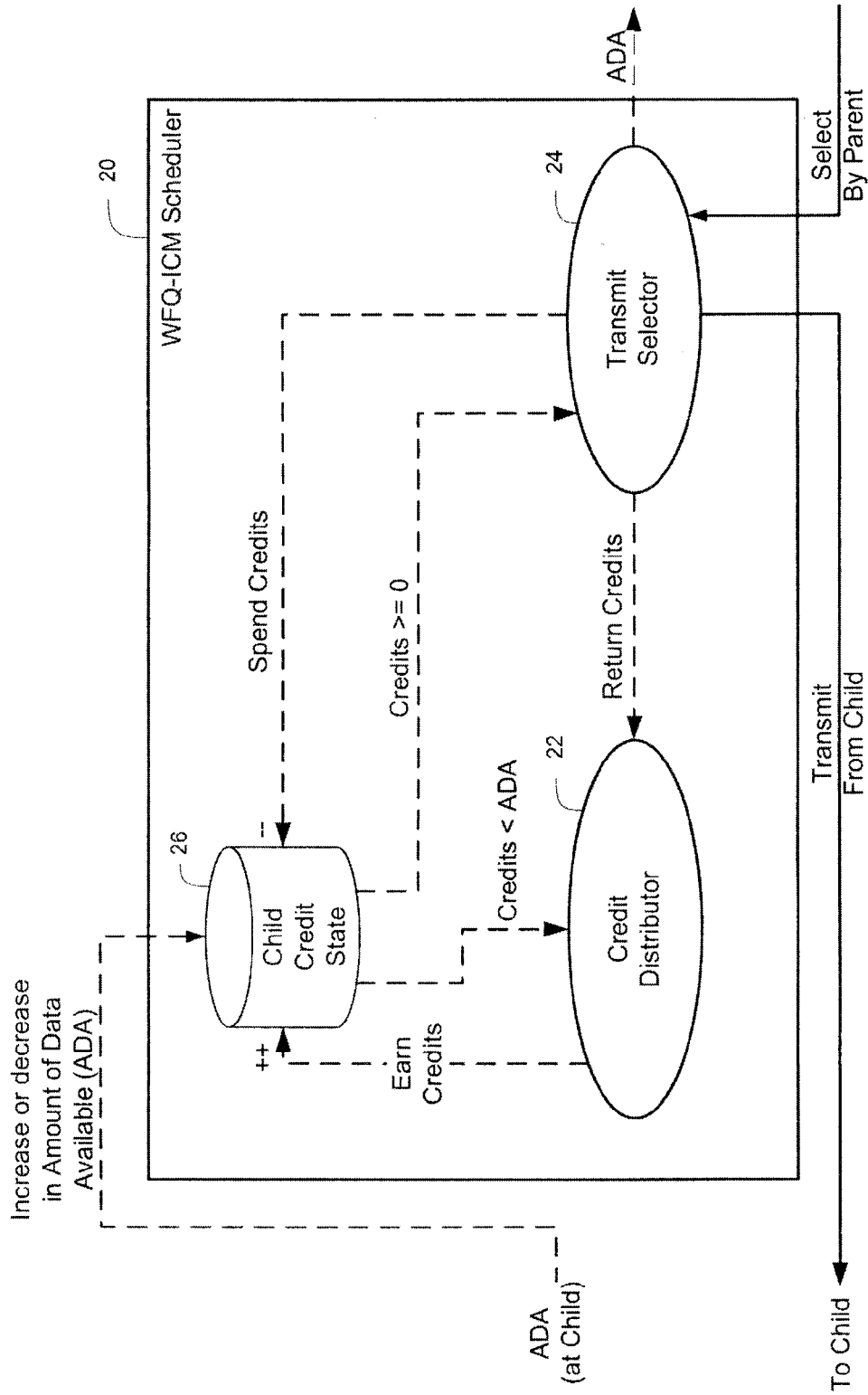
FIG. 2 is a block diagram of an exemplary prior art weighted fair queuing data scheduling process with inverse credit management.

Before describing in detail exemplary embodiments that are in accordance with the present invention, it is noted that the embodiments reside primarily in combinations of apparatus components and processing steps related to implementing a system and method for providing weighted fair queuing for frame-based traffic which allows integration of rate limits and rate guarantees to children competing within the weighted fair queue scheduler. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. A "root" node refers to the highest level node in a weighted fair queuing tree, or the highest node in a branch of a hierarchical weighted fair queuing tree. A "descendant" of a particular node is any node at a level below the node in question whose lineage may be traced back to the node in question. Similarly an "ancestor" of a particular node is any node at a level above the node in question whose lineage may be traced to the node in question. The terms "child," "child node" or "children" refer to any direct descendants of a node in a scheduling tree. Generally, when discussing a relationship to a particular node, the term "child" refers to a node (scheduler node or queue) one level below the node in question. Additionally, any node descending from a node having a higher level may be referred to as a "child node" or "child."

One embodiment of the present invention advantageously provides a system, method and apparatus for weighted fair queuing with inverse credit management that may be used in the presence of rate-shaped traffic. The system and method allow integration of rate limits and rate guarantees to children competing within the weighted fair queue scheduler. A credit balance mechanism enables conservation of credits when children return unused credits. Previously, unused credits were granted by the credit distribution system without the knowledge of how long the child would remain within its rate limits and continue to have data to transmit.

Additionally, unlike prior art, embodiments of the present invention allow children to toggle in and out of eligibility, thereby allowing easy integration of children with rate limits.

Figure 3:
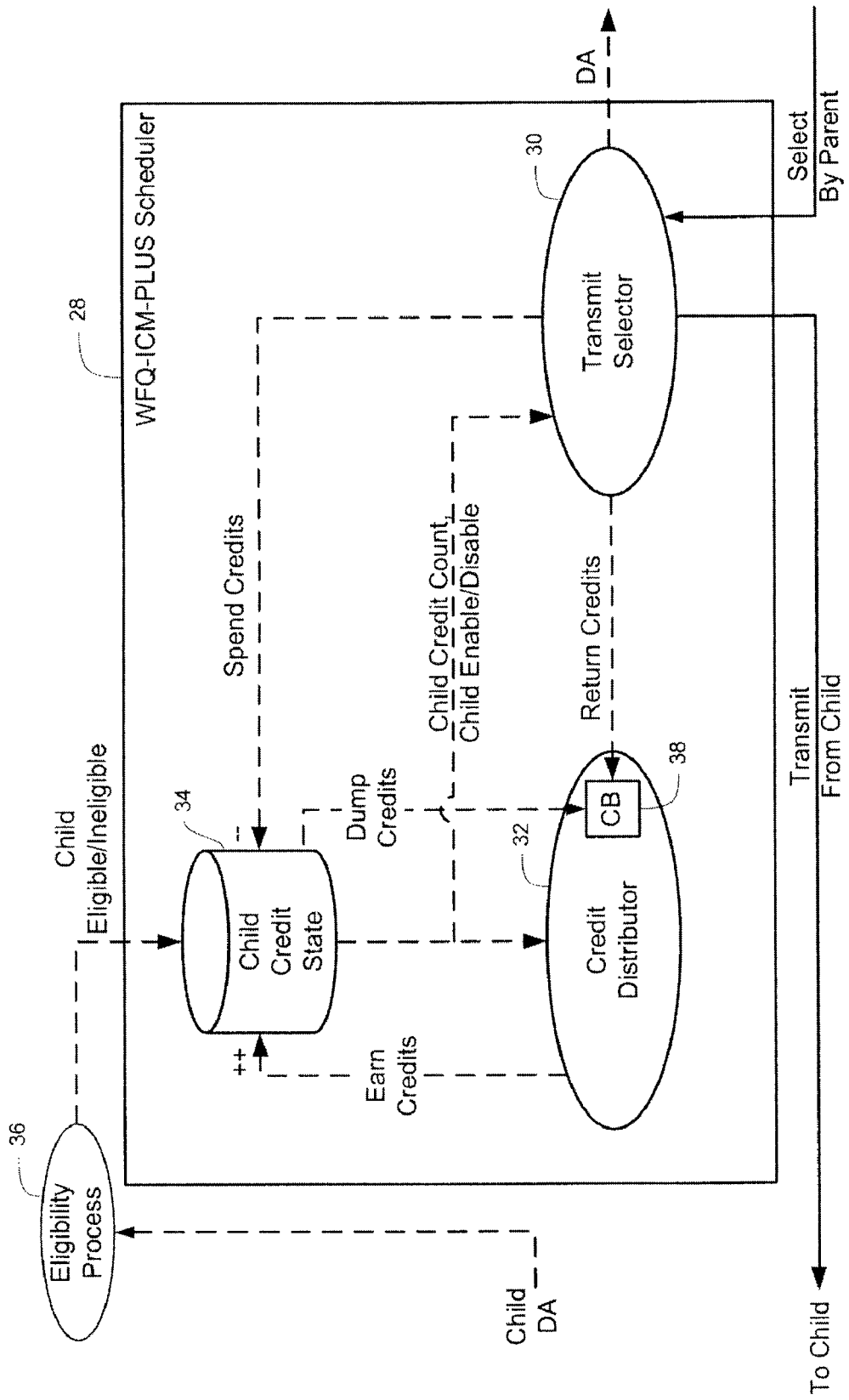
FIG. 3 is a block diagram of an exemplary weighted fair queuing data scheduling process with inverse credit management constructed in accordance with the principles of the present invention.

Referring now to FIG. 3, an exemplary weighted fair queuing scheduler 28 with improved inverse credit management ("WFQ-ICM-Plus") constructed in accordance with the principles of the present invention includes a transmit selector 30, a credit distributor 32, and child credit state database 34. The transmit selector 30 selects a child from all eligible children for transmitting data. A separate eligibility process 36 determines whether a child is eligible for selection for transmission. Details of the operation of the eligibility process 36 are beyond the scope of the present invention; the relevant consideration is simply that the eligibility process 36 determines which children are eligible for selection. In the simplest form, the eligibility process is merely data available at the child. In a more complex form, data available may include rate limits at various levels of the hierarchy. This affects a different behavior from the prior art in that children with negative credits have the potential to be selected for transmission by the transmit selector 30. In addition, embodiments of this invention allow for the possibility of another process instantaneously disabling a previously eligible child, which is also not possible in the prior art.

The credit distributor 32 includes a credit balance ("CB") 38 which contains all surplus credits for the system. The credit distributor 32 is a weighted fair process that grants credits from the credit balance 38 to all eligible children and to all children that have negative credits. The credit distributor 32 tracks the amount of credits each child has accrued at any given time in a child credit state database 34.

Unlike prior WFQ-ICM schedulers, embodiments of the present invention advantageously do not require the system to know precisely how much data is available. Instead, all the credit distributor 32 has to know is that a child is "eligible." The credit distributor 32 may distribute credits to any eligible child. Thus, an interfering process, such as a rate shaper, may readily operate in conjunction with embodiments of the present invention. Theoretically, a child could receive many more credits than the amount of data that child currently has available or will be eligible to send in the near term. However, as soon as a child transitions from "eligible" to "ineligible," all the credits the child has previously acquired are stripped away and returned to the credit balance 38.

The transmit selector 30 selects eligible children to transmit data. Generally, child selection is biased toward children with larger credit counts. Thus, it is more likely that a child with a large positive credit count will be selected for transmission than a child having a low positive, or even a negative credit count. When a child transmits data, credits are decremented from its current credit amount in the child credit state database 34 and returned to the credit balance 38 for redistribution to other eligible children and negative balance children.

Prior WFQ-ICM schedulers did not allow transmission from a child with a negative credit count other than to complete the transmission of a frame started under a positive credit count. However, because the prior art did not allow children to be disabled or ineligible to transmit after gaining credits, it did not need this capability.

Figure 4:
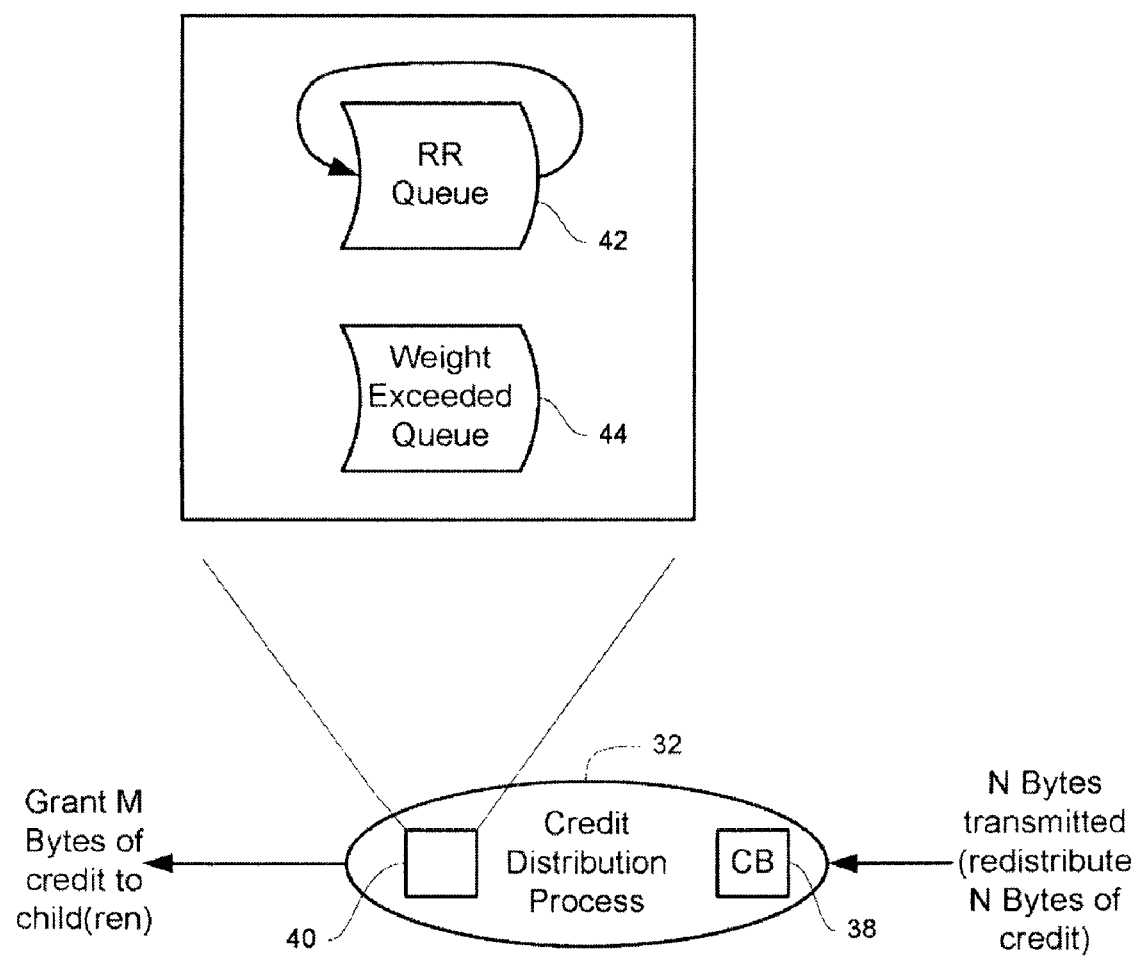
FIG. 4 is a block diagram of an exemplary credit distributor constructed in accordance with the principles of the present invention.

Referring now to FIG. 4, a simplified implementation of an exemplary credit distributor 32 is shown. Generally a round-robin credit distributor 40 distributes credits to eligible and negative credit children at the same rate as data transmissions exit from the scheduler 28. In other words, transmit opportunities from the transmit selector 30 trigger credit distribution opportunities for the credit distributor 32.

During one credit distribution round, each eligible child and negative credit child is allotted a number of entries in the round corresponding to its weight value. Each child in the round gets one credit when it reaches the head of the round robin ("RR") distribution queue 42. In other words, one RR round grants each child one "credit." Thus, for one full credit round, each child "i" (denoted $child_i$) is granted $w_i$ credits where "$w_i$" is the weight value for $child_i$. The number of RR rounds needed to distribute the $w_i$ credits for each $child_i$ is $w_i$. A credit round ends when every $child_i$ has been granted $w_i$ credits. Thus, the length of the credit round is dictated by the child with the largest $w_i$. When the child has received its full weight for that round, it is temporarily placed in a weight exceeded queue 44 to wait, and no further credit distributions are made to that child until the next credit round.

In previous WFQ-ICM schedulers, credit distribution proceeds at exactly the same rate as transmission, so there was never an outstanding credit balance 38. The credits available for distribution are those returned from the transmit selector 30.

In contrast, embodiments of the present invention allow the credit distributor 32 to carry a positive credit balance 32 if necessary. The credit balance 32 may become very large due to previously eligible children becoming ineligible while holding positive credits. To compensate for this potentially large credit balance, the credit distributor 32 is not required to grant the exact number of credit bytes coming in from the transmit selector 30 (represented as "N") as those being granted to children (represented as "M"). Thus, when the credit balance 38 contains excess credits (i.e., CB>0), the credit distributor 32 accelerates the credit distribution by simply increasing the number of credits granted for a full round robin round of the RR distribution queue 42, such that M>N. In other words, for a RR round, the credit distributor 32 distributes M bytes of credit to each child during its turn. Any excess credits may be carried over to the next RR round. On the other hand, if the credit balance 38 drops to zero while M is elevated, the frequency of distribution ("F") may be decreased such that M*F=N, thereby allowing a continuation of granting M bytes of credit to each child until the end of the RR round. Elevating the number of credits granted for an entire RR round ensures fairness between children is maintained. It is worth noting a couple of exceptions in the distribution of an elevated M bytes of credit: children which would exceed their weight by being granted M bytes of credit are only granted the remainder of their weight and children which are not eligible to transmit but are collecting credit to return to zero credits are never granted more than the number of credits required to return to zero credits. Other embodiments of a credit distributor, whether control queue based, vector based or some other method, are also able to accelerate distribution of credits by increasing the "normal" rate of credit distribution, similar in concept to the method described here.

Figure 5:
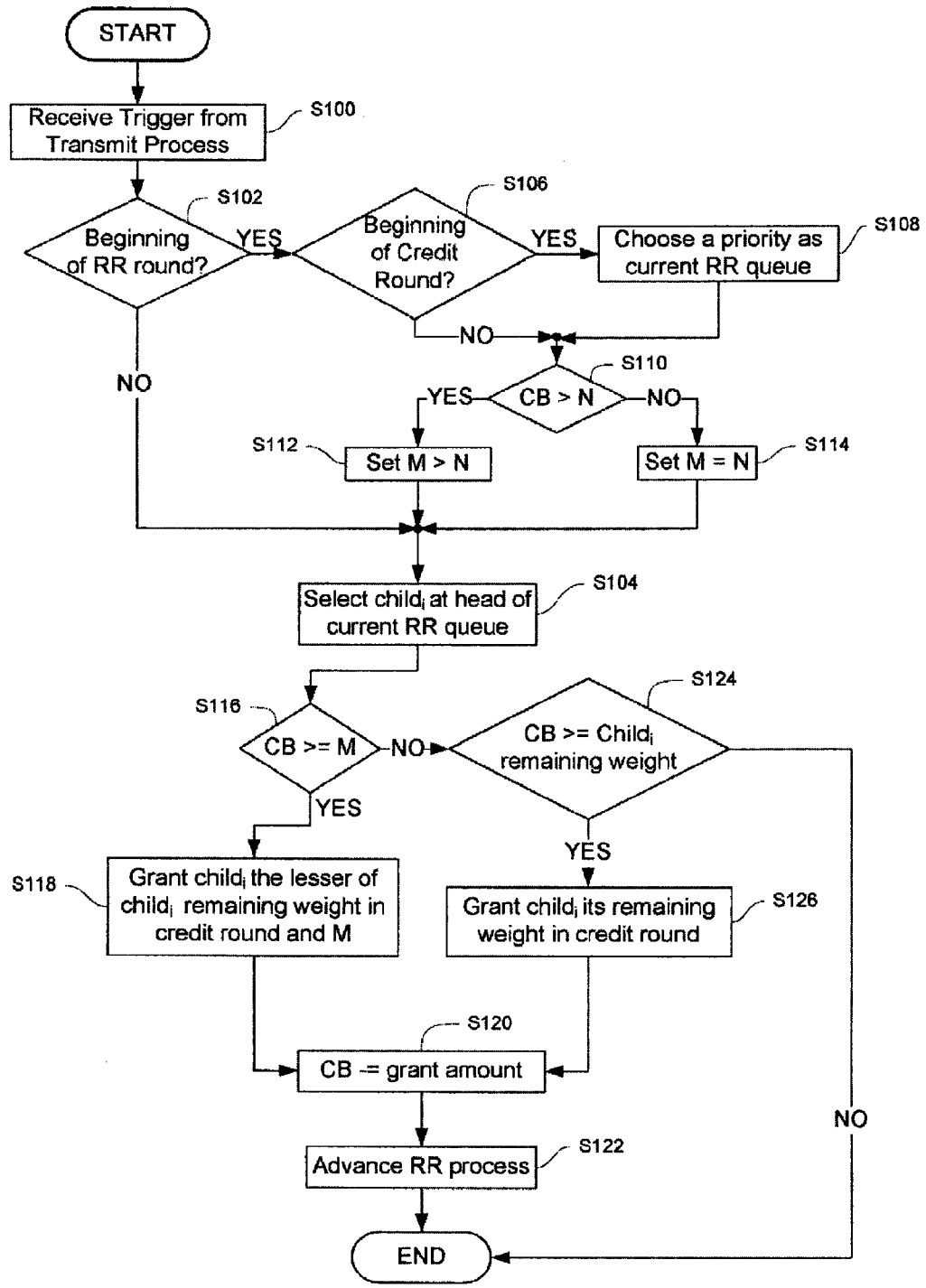
FIG. 5 is a flowchart of an exemplary credit distributor process according to the principles of the present invention.

Referring to FIG. 5, an exemplary operational flowchart is provided that describes steps performed by a credit distributor 32 in response to an opportunity to distribute credit. In FIG. 5, the credit distributor 32 is triggered by the transmit selector 30 one time for N bytes of data transmitted (step S100), but an alternate implementation could have a periodic trigger to achieve the same thing. It is important to note that in alternate embodiments of the present invention, the credit distributor 32 may have actual knowledge of the total transmit byte count such that credits may be distributed in multiples of N bytes or fractions of N bytes. It should also be noted that the following process does not yet address eligibility changes, but eligibility considerations are taken into account further below in relation to FIG. 5.

If the credit distributor 32 is not at the beginning of the RR round (step S102), i.e., credits have already been distributed to some children in the current RR queue, the process selects $child_i$ at the head of the current RR queue to distribute credits to (step S104). In this case, the previous state of credit grant value M will be used. However, if the credit distributor 32 is ready to start a new RR round (step S102), i.e., a previous RR round has been completed, the credit distributor 32 decides whether a credit distribution round must be continued or if an entirely new credit round is needed (step S106). If this is the beginning of a credit round then a RR queue is selected for scheduling (step S108). Up until this point, only a scheduling process which supports a single RR queue has been discussed, so step S108 would just reset the scheduling parameters and begin processing all of the children for the RR queue again. However, as described below in association with FIG. 8, an exemplary embodiment of the current invention allows for multiple RR queues distinguishing multiple priorities of children, in which case step S108 could select a different RR queue for processing. If this is not the beginning of a credit round, then a new RR queue is not required.

Returning to decision block S106, if the credit round is just beginning, the credit distributor 32 determines whether an excess credit balance exists (step S110), in this case more credits than a single transmit event can produce (N). If there is an excess credit balance, the credit distributor 32 enters an accelerated credit distribution cycle (step S112), wherein the credit distribution amount (M) during this credit distribution event and the rest of the credit distribution events in the current RR round exceeds the credits transmitted between credit distribution events (N), i.e., M>N. Otherwise, if there is no outstanding credit balance (step S114), the amount of credit to be distributed during this credit distribution event and for the rest of the RR round is set to equal the amount of credits typically transmitted between credit distribution events, i.e., M=N (step S114). Note that other embodiments of the current invention may use different thresholds for N in decision S110, e.g. CB>x bytes where x is a static or dynamic number used to inject hysteresis into the decision to accelerate credit distribution.

Credit distribution begins by selecting $child_i$ at the head of the current RR queue (step S104). If the credit balance exceeds or equals the number of credits to be granted to each child during the current RR round (step S 16), i.e., CB>=M, $child_i$ is granted the lesser of its remaining weight in the credit round and the number of credits to be granted during the RR round (step S118), M. The amount of credits granted to $child_i$ is deducted from the credit balance (step S 120) and the RR round is advanced to the next child in the RR queue (step S122).

Returning to decision block S116, as long as the credit balance exceeds the remaining weight for $child_i$ (step S124), then $child_i$ is granted its remaining credit weight (step S126). The amount of credits granted to $child_i$ is deducted from the credit balance (step S120) and the RR round is advanced to the next child in the RR queue (step S122). However, if the remaining weight for $child_i$ exceeds the credit balance (step S124), no credits are distributed and the current credit distribution event ends, with $child_i$ remaining at the head of the RR queue for the next credit distribution event.

Figure 6:
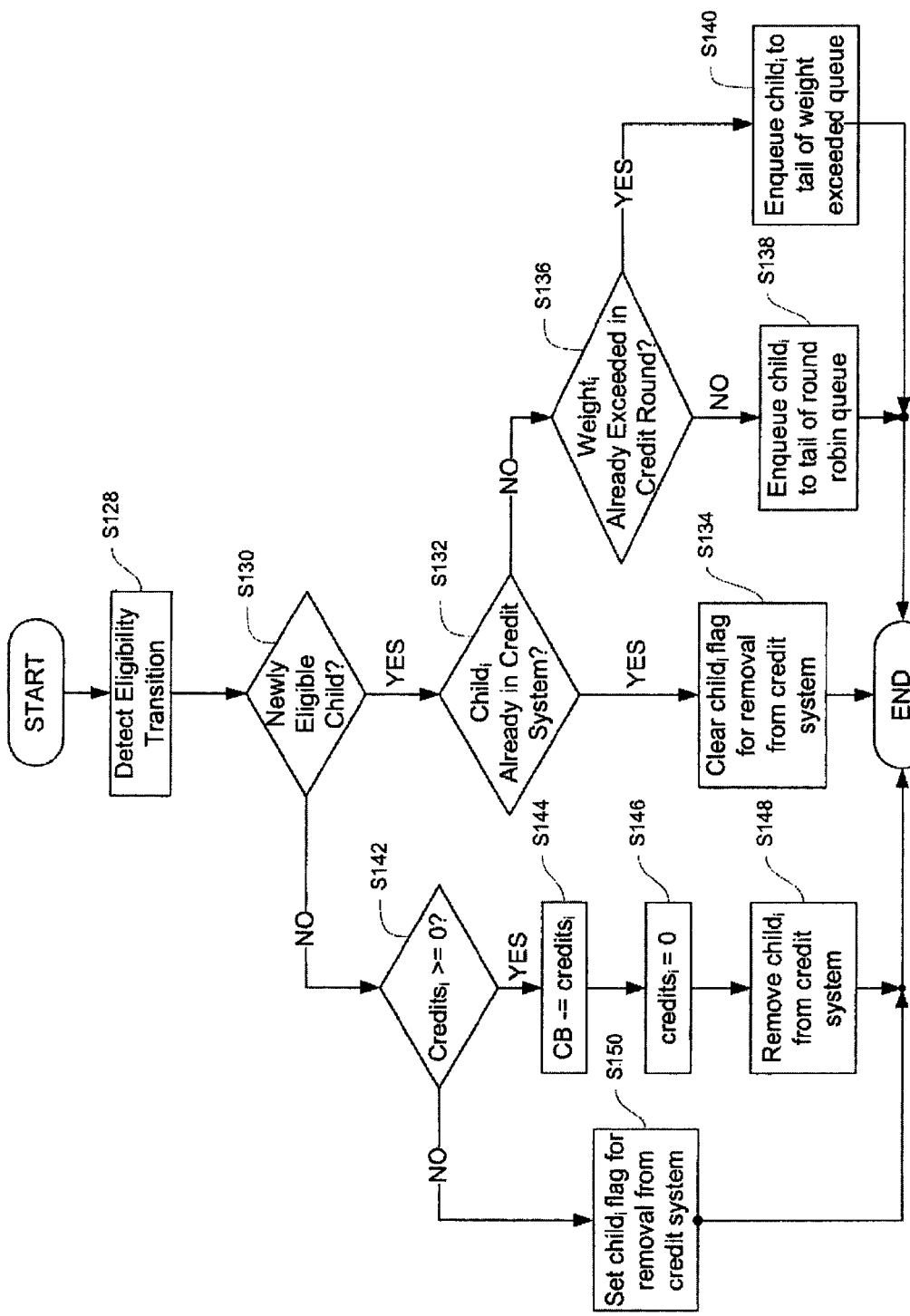
FIG. 6 is a flow chart of an exemplary credit process in response to changes in eligibility according to the principles of the present invention.

Referring now to FIG. 6, an exemplary operational flowchart is provided that describes steps performed by a credit distributor 32 in response to changes in the eligibility status of a child. The credit distributor 32 detects a transition in eligibility status for a $child_i$ (step S128). Eligibility transitions may be announced by a separate process (inside or outside the scheduler), for example, by setting or clearing a flag for the transitioning child, sending an event, or sending a message. If the $child_i$ has transitioned from ineligible to eligible (step S130 YES branch), and $child_i$ is already in the credit system (step S132 YES branch), the credit distributor 32 simply clears the pending removal flag for $child_i$ (step S134). As discussed below in describing step S150, this pending removal flag was set in order to request a child be removed from the credit distributor 32 when it returns to the correct state. $Child_i$ remains able to receive credits determined by its weight and order in the RR queue. However, if $child_i$ is currently not in the credit system (step S132 NO branch), and it has not already received credits in excess of its $weight_i$ in the credit round (step S136 NO branch), $child_i$ is enqueued to the tail of the RR queue (step S138) and will receive credits on its next turn in the present credit round. If $child_i$ has already exceeded its $weight_i$ in the present credit round (step S136 YES branch), $child_i$ is enqueued to the tail of the weight exceeded queue (step S140) and will not receive credits again until the next credit round.

Returning to decision block S130, if the transitioning child is not a newly eligible child, the child is transitioning to an ineligible state. If the newly ineligible $child_i$ currently has positive credits or no credits (step S142), i.e., $credits_i>=0$, any excess credits are returned to the credit balance (step S144) and the credit count for $child_i$ is set to zero (step S146). The $child_i$ is then removed from the credit system (step S148). It should be noted that removal from the credit system is most readily achieved by waiting for the child to work its way to the head of the RR queue and removing the child during its RR turn instead of granting it credits. This method is one potential use of a removal flag. However, alternate embodiments may allow for the newly ineligible $child_i$ to be removed from the system immediately upon surrendering its credits back to the credit balance.

Returning again to decision block S142, if the newly ineligible child has negative credits, i.e., $credits_i<0$, its removal flag is simply set to indicate it is ready for removal. However, it should be noted that any newly ineligible children with a negative credit balance are not removed from the credit system until they have re-earned their deficit credit from the credit balance, i.e., $child_i$ is not removed until $credits_i=0$.

Figure 7:
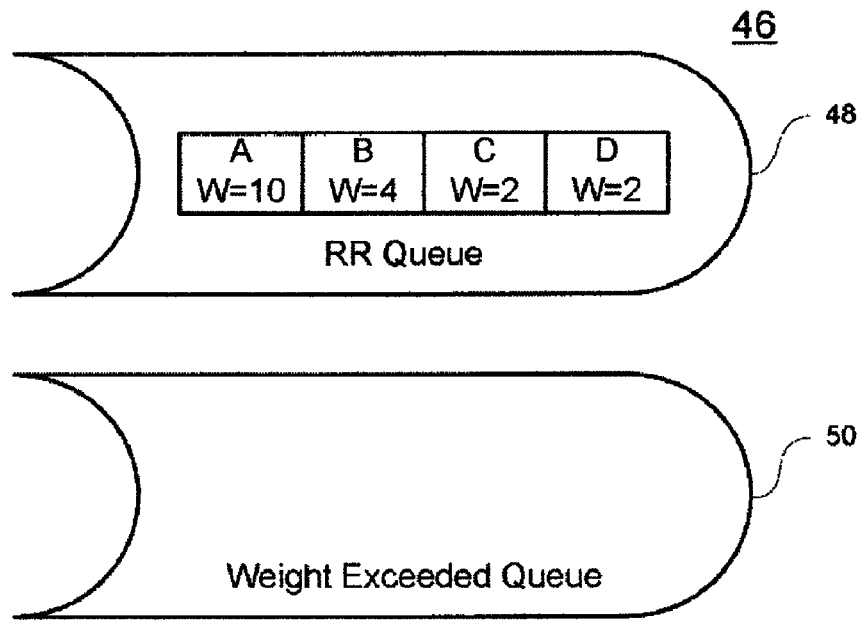
FIG. 7 is a block diagram of an exemplary prior art one-dimensional weighted interleaved round robin scheduling process for high weight children.

Turning now to FIG. 7, a block diagram illustrates an exemplary prior art one dimensional weighted interleaved round robin ("WIRR") scheduling process 46 for high weight children. The WIRR scheduling process 46 makes use of two queues: a round robin ("RR") queue 48 and a weight exceeded queue 50. All children to receive credits in the credit round initially begin in the RR queue 48. Assuming a starting condition as shown in FIG. 7, where there are four children in the RR queue (e.g., A, B, C, and D), wherein A has a weight of 10, B has a weight of 4 and C and D each have a weight of 2. As the number of RR rounds in one credit round is dictated by the child having the highest weight, because Child A has a weight of 10, there could be as many as ten RR rounds in one credit round.

During the first RR round, credit is given to D, the child at the head of the RR queue 48 and then D is moved to the tail of the RR queue 48. Similarly, credit is given to C, B and A, and each child is moved to the tail of the RR queue 48, such that D is returned to the head of the queue. During RR round 2, credit is given to D, making the total of the credits distributed to D during this credit round greater than or equal to its weight, i.e., $credit_D>=$current RR. Thus, D is moved to the weight exceeded queue 50 to wait until the end of this credit round. Similarly, credit is given to C which is then moved to the tail of the weight exceeded queue 50. Finally, credit is given to B and A which are each moved to the tail of RR queue 48. During round 3, one credit is given to B and one credit is given to A. During round 4, one credit is also given to B and one credit is given to A, however, having received its weight in credits for the credit round, child B is moved to the tail of the weight exceeded queue 50, leaving only A in the RR queue 48. During the remaining RR rounds, e.g., rounds 5-10, one credit per round is granted to child A.

The effective credit distribution sequence for this one dimensional WIRR becomes:

DCBA, DCBA, BA, BA, A, A, A, A, A, A.

Thus, during one segment of the credit distribution sequence, there is a burst of seven consecutive distributions to child A. This stacked sequence presents a potential stability problem to the system if child A runs out of data as child A can accumulate credits very rapidly.

Figure 8:
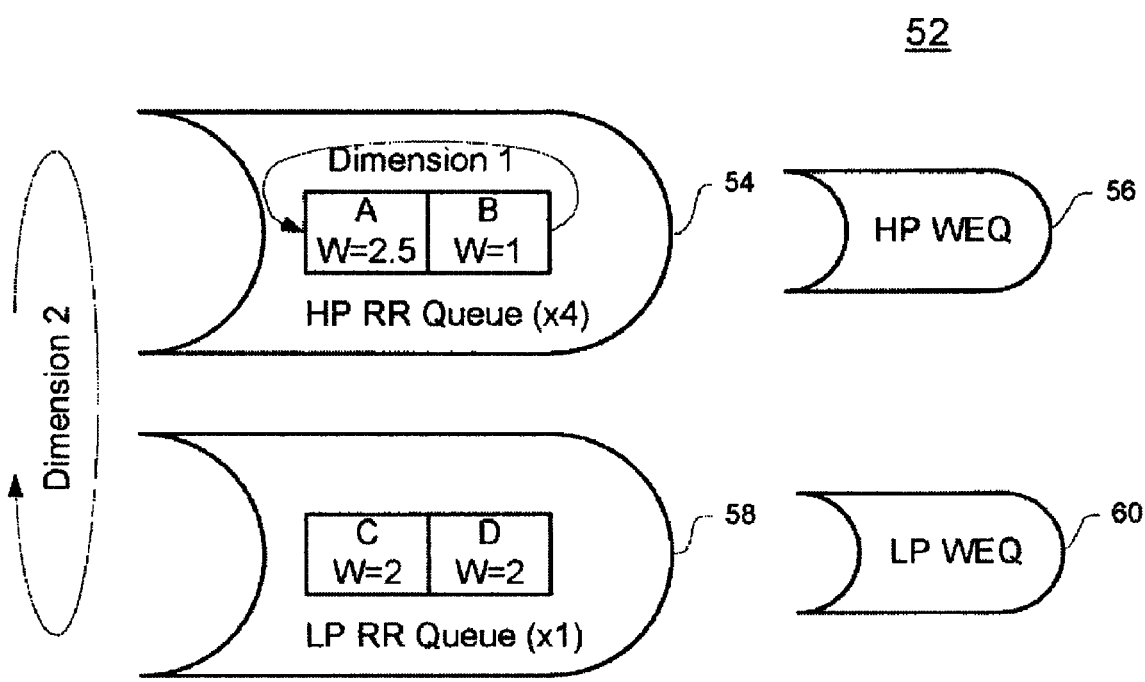
FIG. 8 is a block diagram of an exemplary two-dimensional weighted interleaved round robin scheduling process for high weight children constructed in accordance with the principles of the present invention.

An embodiment of the present invention improves the WIRR scheduling process by introducing a new two-dimensional WIRR scheduler to facilitate smooth scheduling of credit distributions for high weight children. FIG. 8 provides a block diagram of an exemplary two-dimensional WIRR scheduler 52 constructed in accordance with the principles of the present invention. The two-dimensional WIRR scheduler 52 implements multiple RR queues instead of a single RR queue, representing bandwidth or weight categories. The first dimension of scheduling is within a bandwidth category where WIRR credit rounds provide fairness between children in the same bandwidth category. The second dimension of scheduling is between bandwidth categories where a weighted interleaving between RR queue to service with the first dimension scheduler achieves the bandwidth multiplier associated with the bandwidth categories.

The two-dimensional WIRR scheduler 52 may include at least two sets of RR queues having associated weight exceeded queues wherein each queue "i" is configured as a bandwidth category with a bandwidth multiplier "$n_i$." The children are interleaved within a RR queue based on an adjusted weight (more later) with a WIRR round and between RR queues by the order of servicing the queues between full WIRR rounds. In the second dimension scheduler, a RR queue$_i$ having a multiplier of $n_i$ is executed $n_i$ times as many full WIRR rounds as a by 1 (depicted x1) queue. For example, in the two-dimensional WIRR scheduler 52 of FIG. 8, there is a high priority ("HP") RR queue 54 having a multiplier of 4, an HP weight exceeded queue 56, a low priority ("LP") RR queue 58 having a multiplier of 1, and an LP weight exceeded queue 60. The HP queue 54 WIRR credit round is executed 4 times for every one WIRR credit round execution of the LP queue.

A fixed pattern for executing the RR queues is acceptable as long as the pattern is work conserving, meaning useful scheduling decisions can be made even if some of the RR queues contain no eligible children. For example, for the two-dimensional WIRR scheduler 52 having an HP queue 54 with a x4 multiplier and an LP queue 58 with a x1 multiplier, the credit distribution pattern is HP, HP, HP, HP, LP, repeat. Weights used for the WIRR credit round are scaled by the second dimension multiplier, wherein the adjusted weight equals full weight divided by $n_i$.

For example, using the same weights and children as used above in the discussion relating to FIG. 7, in the two-dimensional WIRR scheduler 52 of FIG. 8 the children are arranged such that A and B are in the HP queue 54, and C and D are in the LP queue 58. Child A has an adjusted weight of 2.5 so that its full weight remains 10 (e.g., adj. weight*multiplier=full weight; 2.5*4=10). Likewise, B has an adjusted weight of 1 to reflect its full weight of 4 (e.g., 1*4=4). As the multiplier for the LP queue 58 is 1, C and D retain their original weight of 2.

During the first WIRR credit round of the two dimensional WIRR, only the HP queue 54 is serviced. Thus, the credit distributor during WIRR round 1 grants B one credit, and A two credits, while retaining a remainder weight for child A of 0.5. During WIRR credit round 2, once again, only the HP queue 54 is serviced, but this time, B is granted 1 credit and A is granted 3 credits (e.g., 2.5 weight for this round+0.5 weight remainder=3 credits). The third WIRR round is a repeat of WIRR round 1, wherein B receives 1 credit and A receives 2 credits with a 0.5 remainder. The fourth WIRR round is a repeat of round 2, wherein B is granted 1 credit and A is granted 3 credits. The fifth and final WIRR round services the LP queue 58 with children C and D each receiving 2 credits. Thus, the effective credit grant order per full credit round for the two-dimensional WIRR scheduler 52 is:

$$\begin{array}{ccccc} H & H & H & H & L \\ (BA, A), & (BA, A, A), & (BA, A), & (BA, A, A), & (DC, DC). \end{array}$$

It should be noted that the largest consecutive distribution burst is reduced to three A distributions, which is less than half of the largest burst of the prior art one-dimensional WIRR 46. It should also be noted that this procedure may be implemented with a single weight exceeded queue because only one RR queue is used at a time.

A non-O(1) algorithm, i.e., a hierarchical scheduler having a computational complexity other than O(1) using commonly known "big-0" notation, may be satisfactory for the second dimension as scalability is not required. As shown above, strong interleaving limits the length of burst from the highest weighted children. Although discussed above in the context of a credit distributor, it is conceivable that the two-dimensional WIRR scheduler 52 of the present invention could be used as a process for scheduling dequeuing of transmit queues by a transmit selector 30.

Figure 9:
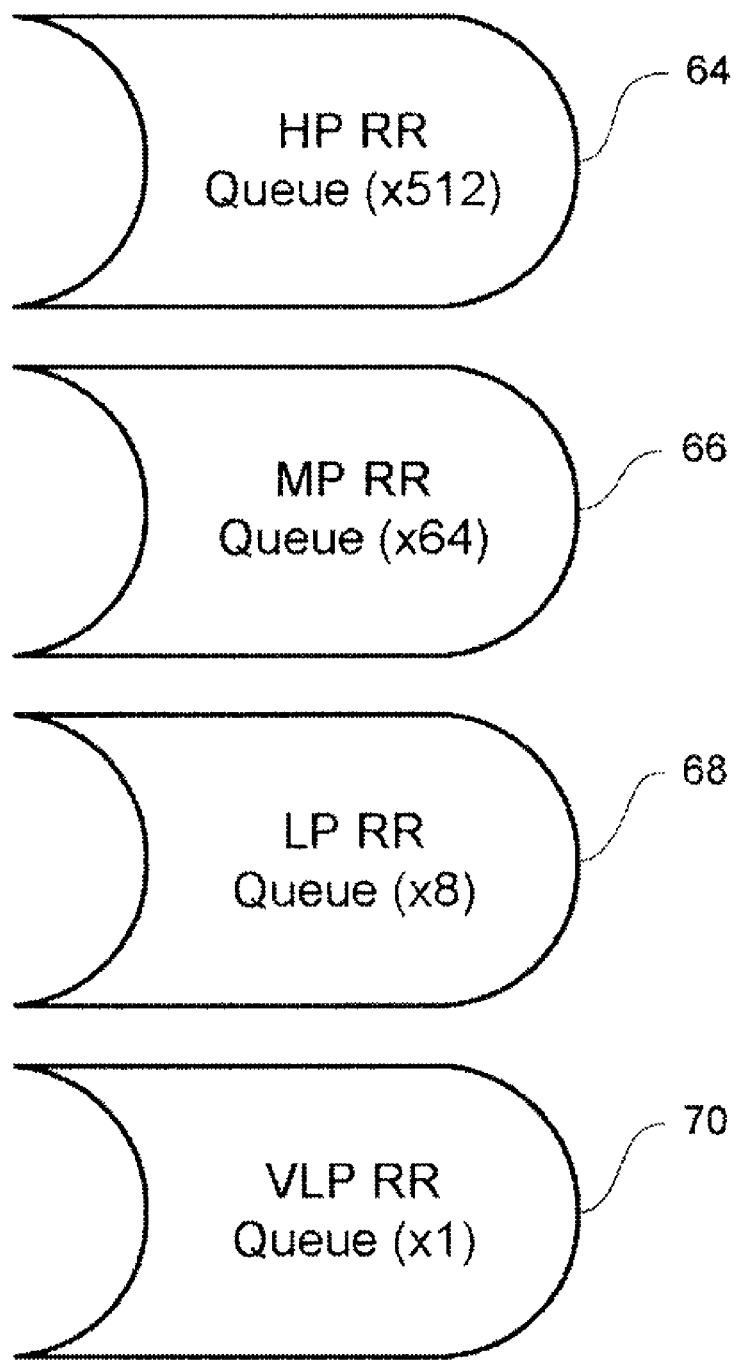
FIG. 9 is a block diagram of an exemplary two dimensional weighted interleaved round robin scheduling process with four priority levels constructed in accordance with the principles of the present invention.

The concept of the two dimensional WIRR may be extended to implement systems having more than two priority levels. FIG. 9 provides a block diagram of a WIRR scheduler 62 having four priority levels represented by four priority RR queues: a high priority ("HP") queue 64, a medium priority ("MP") queue 66, a low priority ("LP") queue 68 and a very low priority ("VLP") queue 70. Fixed multipliers between the queues are selected to provide a large dynamic range of scheduling. For example, assuming that the highest adjusted weight value for any child in any RR queue is 8 and the minimum adjusted weight is 1, the maximum total weight for any child is 4096 ($8^4$). Queue selection is calculated based on weight, so when all queues contain children, every 585 scheduling events, the HP queue 64 is selected 512 times, the MP queue 66 is selected 64 times, the LP queue 68 is selected 8 times, and the VL queue 70 is selected once. The WIRR scheduler 62 is work conserving, so queues containing no children are not selected. The calculated or configured credit distribution pattern should seek to maximally distribute the scheduling opportunities of larger weight queues. Additionally, a full standard WIRR round should be performed each time the queue is selected. The queue weights depicted in FIG. 9 are illustrative but do not represent the only strategy for weighting the RR queues. For example, a different weighting strategy might opt to uniformly step the queue weights instead of the exponential strategy shown. Another strategy could implement dynamic queue weights (multipliers) which are modified depending upon the weight of the children active in the system.

The credit distributor 32 reacts to a non-zero credit balance by increasing the rate of credit distribution, in other words, credit distribution acceleration ("CDA"), which is depicted as M>N in FIG. 5. The CDA method combines multiple RR rounds in the same credit round into a single processing pass through the RR queue. This is achieved within a credit round of any single bandwidth category, so the second dimension of scheduling is not explicitly involved. This method requires knowledge of the beginning and end of a RR round and evaluates the magnitude of the CDA or M at the beginning of each RR round. The number of RR rounds combined in a CDA round is typically 2 (M=2). It is also perceived to be of value to increase to M to 4 when the credit balance 38 is particularly large, potentially configured as a threshold to compare against credit balance 38.

An alternate embodiment combines the maximum number of RR rounds into a single pass by allocating the full remaining weight of each child in the current credit round, thereby ending the WIRR credit round. Yet another implementation calculates the number of children involved in the RR round and sets the acceleration to 1+CB/"number of children", effectively eliminating the credit balance 38 in a single pass through the current RR queue.

The CDA method allows for the credit distribution rate return to normal in the middle of an accelerated RR round by skipping opportunities to distribute credits. In other words, if M is 2 and the credit balance 38 has been returned to zero, then only distribute credits every other opportunity, e.g., M×N×0.5=N. The test for continued acceleration is simple—as long as the credit balance is greater than the minimum of M and the remaining weight$_i$, then a child$_i$ at the head of the RR queue can be served credits.

Credit Distribution Acceleration ("CDA") may be executed RR round by RR round at any priority level. The CDA triggers at the start of a RR round. The acceleration factor, M, chosen at the start of the RR round applies for the entire RR round. Assigning children adjusted weights of 1 or less should be avoided because only children with adjusted weights>1 can only participate in this form of acceleration. Children whose remaining weight in a credit round is less than the credits dictated by the CDA only receive their remaining weight (i.e. opportunity to accelerate is lost or partially lost).

Attention is now directed away from the credit distributor 32 to the counterpart transmit selector 30, constructed in accordance with the principles of the present invention. Prior inverse credit management ("ICM") schedulers contained only one transmit queue servicing only children with positive credits. Children were selected for transmission according to, for example, a round robin order and enqueued at the tail of the transmit queue. The child at the head of the queue was then selected to transmit.

Figure 10:
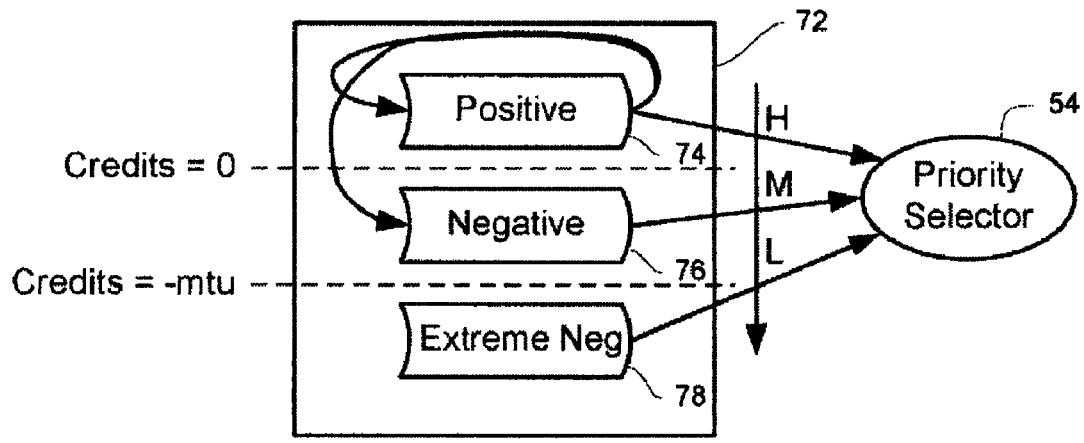
FIG. 10 is a block diagram of an exemplary basic transmit selector constructed in accordance with the principles of the present invention.

FIG. 10 illustrates an exemplary basic transmit control structure 72 constructed in accordance with the principles of the present invention. In accordance with an embodiment of the present invention, the basic transmit control structure 72 includes three separate transmit control queues: a positive queue 74, a negative queue 76 and an extreme negative queue 78. All children that are eligible to transmit, e.g., having data available and are enabled, are present in one of the transmit control queues. A priority selector 80 chooses which of the three transmit control queues to transmit from based on a strict priority system. In other words, the highest priority transmit control queue that contains a child is always selected before lower priority transmit control queues. Within each transmit control queue, children are selected in a simple round robin fashion, i.e., no weights. A transmission opportunity triggers a corresponding credit distribution opportunity.

Children are sorted into a transmit control queue based on the number of credits they possess. Children are dynamically moved between transmit control queues as their credit balances change. Children with a credit count above zero are placed in the positive queue 74. If not for the "credit dumping" aspect of the system when a child becomes ineligible, the expected behavior would be that only children from the positive credit queue 74 transmit. Because the present invention allows for credit dumping (where the credit balance is greater than N), the sum of all credits held by all active children might be negative. Children with a negative credit count are placed in the negative queue 76.

The standard positive transmit queue 74 and negative transmit credit queue 76 contain children with normal credit counts. Children in the positive transmit queue 74 have received slightly more credits than transmits, while those in the negative transmit queue 76 have received slightly less credits than transmits. Transmitting from the standard positive transmit queue 74 is the normal mode of operation if ineligibility is not triggering perturbations to the credit balance 38. However, many of the children will be held in the negative transmit queue 76 after a transmission until the child's credit count can be restored by the credit distributor 32.

It is foreseeable that the sum of the credits currently held by all active children might be negative, thus some children having a negative credit count may occasionally have to transmit, further reducing their credit count. However, children with a large number of transmissions while negative may be separated out to reduce instantaneous unfairness. Thus, a threshold value, e.g., the negative of the maximum transmit unit for the transmission medium, is set for which children having a negative credit balance below such threshold are placed in the extreme negative queue 78. Transmission from the extreme negative queue 78 suggests a very large surplus credit balance 38 in the credit distributor 32 which may require special attention. The extreme negative queue 78 prevents children from spiraling down to very low credit balances unless all children are spiraling down. A transmission from the extreme negative queue 78 is an indication of an unhealthy credit balance 38 where the system is unstable. An emergency measure which can be taken to protect credit balance 38 from additional growth is to decrease the transmit credit spend rate (e.g., spend N/4 instead of N credits for a transmission). This discontinuity in the cost of transmitting data introduces error in the weighted fairness algorithm as some data will transmit at N cost and other data will transmit at N/4 cost, however this is a simple implementation to protect against infinite growth of the credit balance 38.

Figure 11:
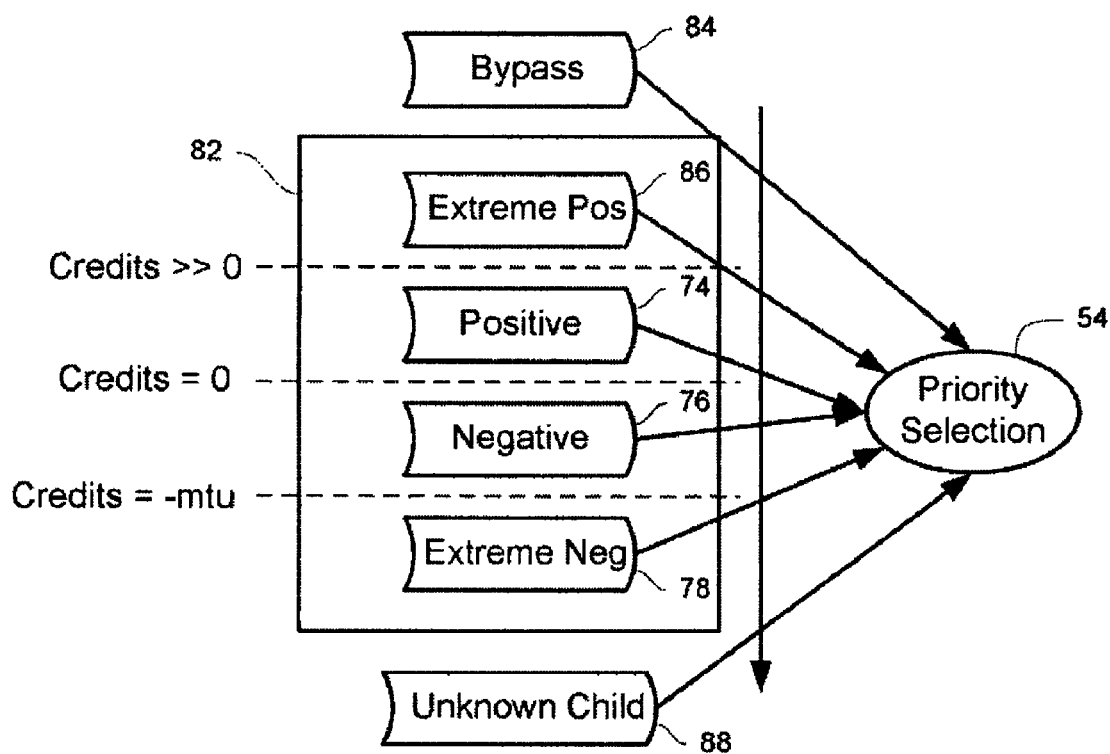
FIG. 11 is a block diagram of an exemplary advanced transmit selector constructed in accordance with the principles of the present invention.

Additional embodiments employ a more advanced transmit control structure 82, as shown in FIG. 11. This advanced transmit control structure 82 combines the three transmit control queues discussed above with additional queues that may be optionally available for more flexible scheduling variations and entirely new features. For example, the transmit control structure 82 may merge strict priority children, such as children containing packets of voice data, with the weighted fair queuing children through a highest priority bypass control queue 84. The advanced transmit control structure 82 and methodology discussed above allows this integration of priority scheduling and weighted fair queuing with minimal cost.

Other optional transmit control queues may include an extreme positive queue 86 and an unknown child queue 88. The extreme positive queue 86 prevents spikes in credit count due to blocking in the transmit system, thereby improving the stability of the credit balance. Although the extreme positive queue 86 is optional, it serves a very desirable function as high weight children without priority transmit can build credits quickly. Large credit stores are dangerous to system stability because credits are suddenly dumped back into the credit balance 38 if the child becomes ineligible. If any child has a large credit count, the transmit selector 30 should poll the child to determine if the child is in danger of reaching an upper credit threshold. The upper credit threshold may be set by the system designer according to the specifications of the transmit medium, including such parameters as current traffic flow. If the child exceeds the upper credit threshold, the child should be moved to the extreme positive queue 86 to receive priority service. The unknown child queue 88 allows for the possibility that a child is known to the parent scheduler which is not yet absorbed into (known to) the current scheduler. If the current scheduler is selected for scheduling and has no other children eligible, then the unknown child queue 88 provides the needed child.

Figure 12:
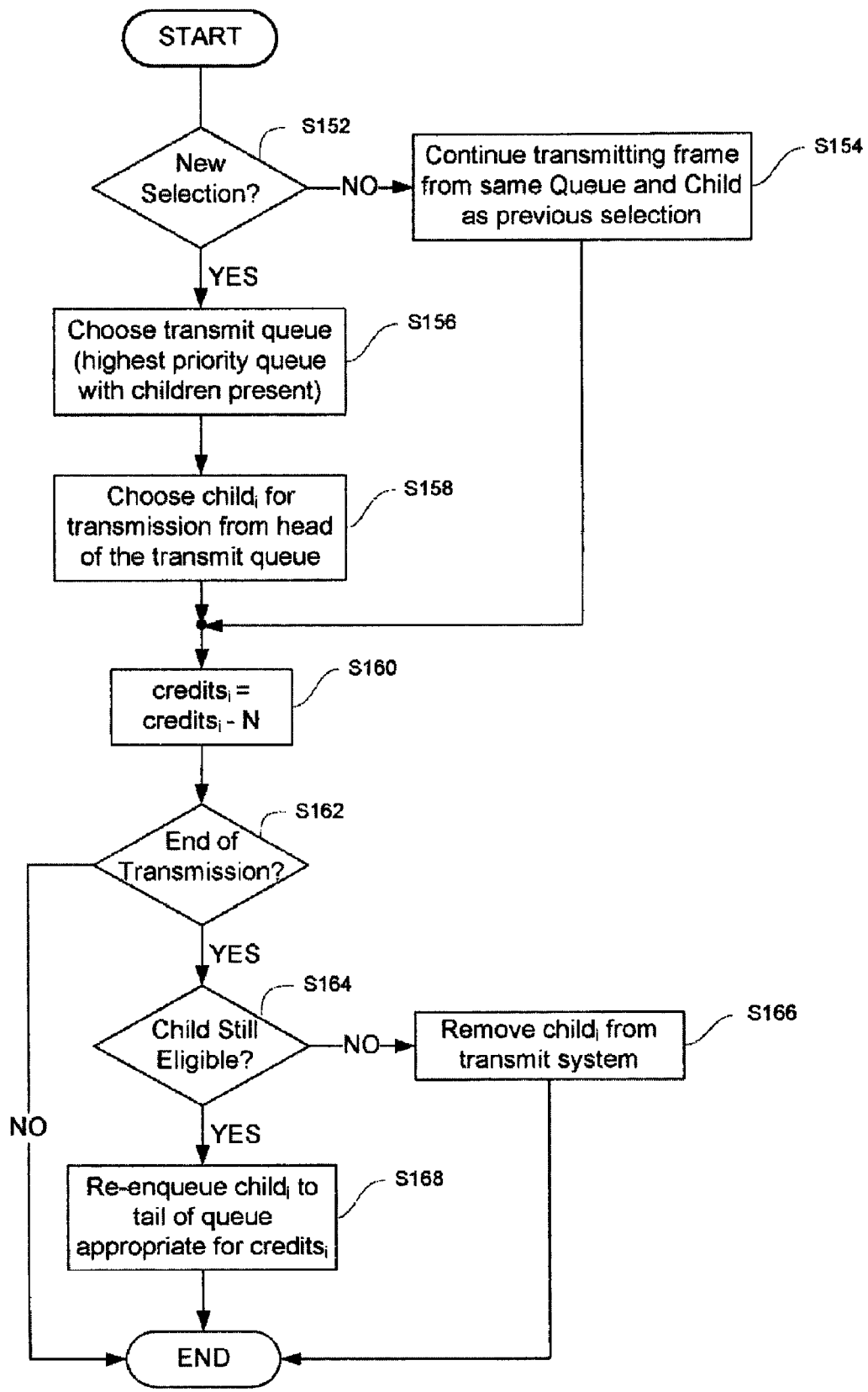
FIG. 12 is a flow chart of an exemplary transmit selection process for weighted fair queuing children according to the principles of the present invention.

Referring to FIG. 12, an exemplary operational flowchart is provided that describes steps performed by a transmit selector 30 during selection of weighted fair queuing children. The transmit selector 30 determines if the child is a new selection (step S152). If not, the transmit selector 30 continues transmitting a frame from the same queue and/or child as the previous selection (step S154). If the selection is new (step S152), the transmit selector 30 chooses the highest priority transmit queue having children present for dequeuing (step S156) and selects $child_i$ from the head of the transmit queue for transmission (step S158). After a child has been selected for transmission, the transmit selector 30 deducts the amount of bytes transmitted ("N") from the total available credits ($credit_i$) for that $child_i$ (step S160). When the transmit selector 30 reaches the end of the transmission (step S162), if the $child_i$ is no longer eligible (step S164), the $child_i$ is removed from the transmit system (step S166), i.e., the $child_i$ is no longer visible to the transmit selector 30. However, if the $child_i$ remains eligible (step S164), the $child_i$ is re-enqueued to the tail of the transmit queue that is appropriate for the child's remaining number of $credits_i$ (step S168).

Figure 13:
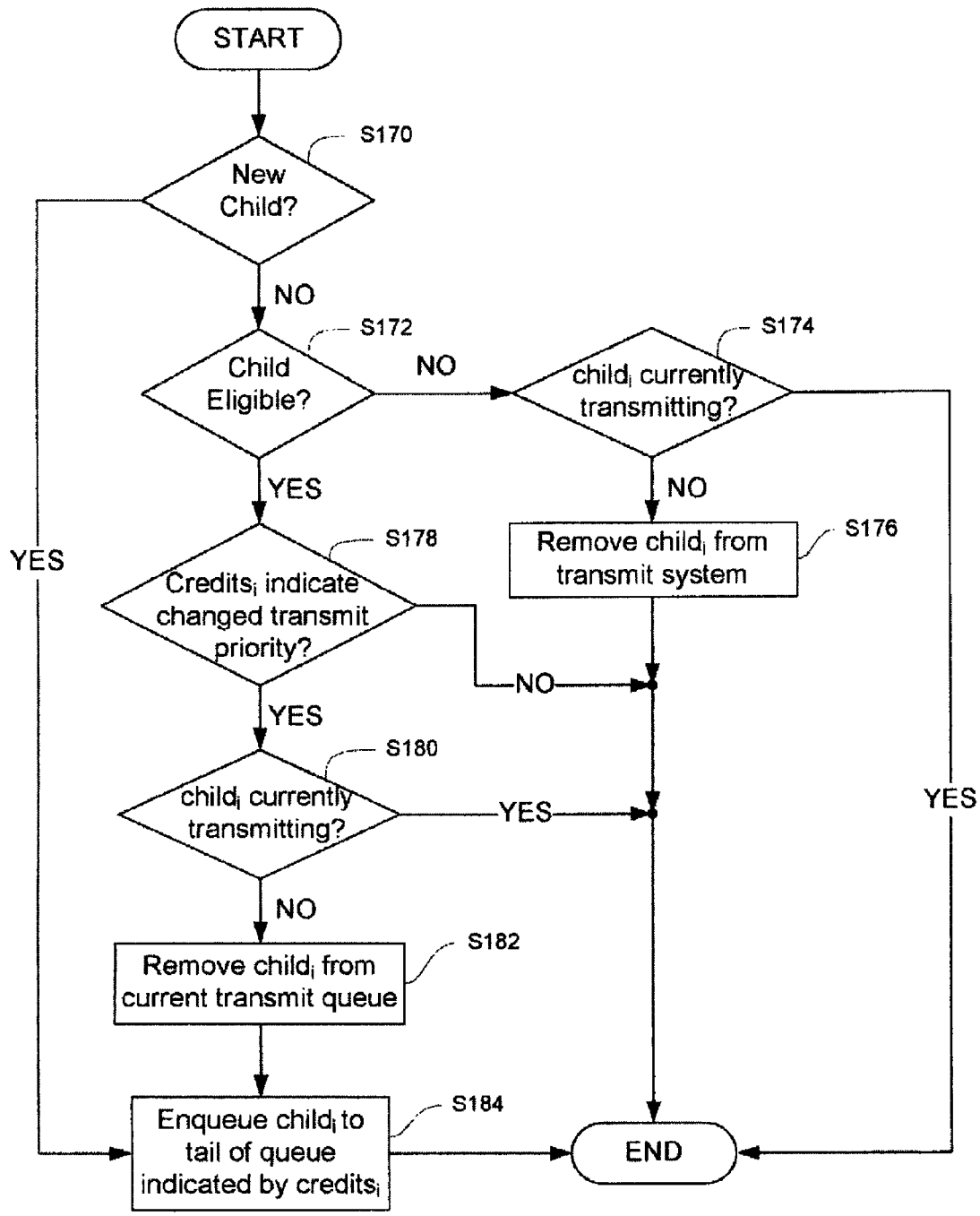
FIG. 13 is a flow chart of an exemplary transmit selection process in response to increased credit and eligibility changes according to the principles of the present invention.

Referring now to FIG. 13, an exemplary operational flowchart is provided that describes steps performed by a transmit selector 30 in response to increased credits and eligibility changes. The transmit selector 30 determines if the $child_i$ is a new child (step S170), meaning it is not currently in the transmit selector queuing system. If the $child_i$ is not new, and the transmit selector 30 determines that the $child_i$ is no longer eligible (step S172), then if $child_i$ is not currently transmitting data (step S174), the $child_i$ is removed from the transmit system (step S176). Otherwise, if the $child_i$ is currently transmitting (step S174), the transmit selector 30 does not react now. The reaction will happen as part of the dequeue processing in FIG. 12.

Returning to decision block S172, if the $child_i$ is eligible, and the $credits_i$ indicate that the child has received enough new credits to change priority levels (step S178), as long as the $child_i$ is not currently transmitting (step S180), then the $child_i$ is removed from the current transmit queue (step S182) and enqueued to the tail of the transmit queue indicated by the number of $credits_i$ (step S184), i.e., a higher priority transmit queue.

Additionally, referring back to decision block S170, if the $child_i$ is a new child, the transmit selector 30 simply enqueues the $child_i$ to the tail of the transmit queue indicated by the number of $credits_i$ (step S184).

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A system for scheduling data for transmission in a communication network, the communication network having a plurality of children, the system comprising:
a credit distributor operating to:
grant credits to at least one of eligible children and children having a negative credit count, each credit redeemable for an amount of data transmission;
affect fairness between children with ratios of granted credits;
maintain a credit balance representing a total amount of undistributed credits available;
deduct the granted credits from the credit balance;
strip all positive credits from a previously eligible and enabled child upon the child becoming at least one of disabled and ineligible; and
add the stripped credits to the credit balance for redistribution; and
a transmit selector communicatively coupled to the credit distributor, the transmit selector operating to:
select at least one eligible and enabled child for dequeuing;
bias selection of the at least one eligible and enabled child to an eligible and enabled child with positive credits; and
add credits to the credit balance corresponding to an amount of data selected for dequeuing.

2. The system of claim 1, further comprising an eligibility updater operating to determine an eligibility status for each child, wherein eligibility status indicates whether a child is eligible to transmit data based on criterion separate from weighted fairness affected by the credit distributor, including at least one of rate limits, burst limits and data availability.

3. The system of claim 1, wherein the credit distributor has at least one round robin control queue containing at least one identifier of at least one of an eligible child and a child having a negative credit count, wherein the credit distributor further operates to:
interleave granting credits to children within a first round robin control queue;
grant one credit to each child in the first round robin control queue in a round robin round;
repeat round robin rounds until each child is granted an amount of credits corresponding to a weight of the child;
remove each child from the first round robin control queue when the child is granted an amount of credits corresponding to the weight of the child; and responsive to having granted an amount of credits to each child corresponding to the weight of the child, return the children to the first round robin control queue.

4. The system of claim 3, wherein the credit distributor has a second dimension weighted interleaved scheduler to allow multiple round robin control queues, each round robin control queue containing at least one identifier of at least one of an eligible child and a child having a negative credit count, each round robin control queue representing at least one of a bandwidth category and a weight category, and each round robin control queue receiving a multiplier, wherein the credit distributor further operates to;
　interleave selection of the round robin control queues for credit distribution, wherein each round robin control queue is selected an amount of turns corresponding to its multiplier;
　select a first round robin control queue for credit distribution;
　grant credits to children within the first round robin control queue, wherein each child is granted an amount of credits corresponding to a weight assigned to the child for each round robin control queue turn, and wherein the credits are granted among children in a round robin fashion;
　select the round robin control queues with remaining turns in an interleaved order until all turns are exhausted; and
　grant credits to children identified within the selected round robin control queues in turn.

5. The system of claim 1, wherein the credit distributor further operates to;
　maintain a balance between credit granting and data transmission;
　grant credit at a rate approximately equal to a normal data transmission rate; and
　responsive to having an outstanding credit balance, increase the rate of granting credits.

6. The system of claim 5, wherein the credit balance is excessive prior to a start of a round robin round, the credit distributor further operates to increase the rate of granting credits to eligible children by combining multiple round robin rounds to one round by granting multiple credits to each child in a single pass; and
　wherein excessive includes one of exceeds a configurable threshold, exceeds an amount of credit greater than an amount of credit consumed by one transmit event, and greater than zero.

7. The system of claim 1, wherein the transmit selector has a plurality of transmit control queues for dequeuing, each transmit control queue containing at least one identifier of an eligible child and having a priority level defined according to credit count requirements; and
　the transmit selector further operates to assign each eligible child to one of the plurality of transmit control queues, each eligible child having a credit state meeting the credit count requirements for its assigned transmit control queue.

8. The system of claim 7, wherein the transmit control queues include a positive transmit queue, a negative transmit queue, and an extreme negative transmit queue, and wherein:
　a first credit count threshold between the positive transmit queue and the negative transmit queue equals zero;
　a second credit count threshold between the negative transmit queue and the extreme negative transmit queue equals a negative of a minimum transmit unit for the communication network;
　the positive transmit queue having a higher selection priority than the negative transmit queue; and
　the negative transmit queue having a higher selection priority than the extreme negative transmit queue.

9. The system of claim 8, wherein the transmit control queues further include at least one of an extreme positive transmit queue, a bypass queue, and an unknown child queue:
　the bypass queue having a highest priority level, and wherein the bypass queue does not return credits to the credit balance;
　the extreme positive transmit queue having a higher priority level than the positive transmit queue, the negative transmit queue, and the extreme negative transmit queue; and
　the unknown child queue containing an eligible and enabled child with an unknown credit state and having a lowest priority level.

10. The system of claim 8, wherein the transmit selector is further operable to decrease the credits spent in transmitting data from the extreme negative queue by adding credits to the credit balance corresponding to a fraction of the amount of data selected for dequeuing.

11. A method for distributing credits to children in a communication network, each credit redeemable for an amount of data transmission, the method comprising:
　granting credits to at least one of eligible and enabled children and children having a negative credit count;
　maintaining a credit balance representing a total amount of undistributed credits available; and
　deducting the granted credits from the credit balance;
　implementing a two-dimensional weighted interleaved round robin scheduler having multiple round robin control queues, each round robin control queue containing at least one identifier of at least one of an eligible child and a child having a negative credit count, each round robin control queue representing at least one of a bandwidth category and a weight category;
　receiving a multiplier at each round robin control queue;
　interleaving a selection of round robin control queues for credit distribution, each round robin control queue is selected an amount of turns corresponding to its multiplier;
　selecting a first round robin control queue for credit distribution;
　granting credits to children identified within the first round robin control queue;
　selecting the round robin control queues with remaining multiplier weight in turn until all turns are exhausted; and
　granting credits to children identified within remaining round robin control queues in turn.

12. The method of claim 11, further comprising:
　stripping all credits from a previously eligible and enabled child upon the child becoming at least one of disabled and ineligible; and
　adding the stripped credits to the credit balance for redistribution.

13. The method of claim 11, wherein credits are granted to children identified within a selected round robin queue according to an adjusted weight value for each child; and
　wherein a total weight value for each child over a set of all turns equals its adjusted weight value times the multiplier for its round robin queue.

14. The method of claim 11, wherein the credit balance is greater than an amount of data selected for dequeuing between credit distribution events, the method further comprises:
　implementing one or more round robin control queues containing one or more children for use in interleaving credit granting between one of eligible and enabled children and children with negative credit balance; and granting additional credits to children in a round robin control queue by combining multiple round robin rounds into one round by granting multiple credits to each child for a full round robin pass through a round robin control queue.

15. A method for scheduling data for transmission in a communication network, the communication network having a plurality of children, the method comprising:

establishing a plurality of transmit control queues for dequeuing, each transmit control queue capable of containing at least one identifier of a corresponding eligible child and having a priority level defined according to a corresponding credit count requirement, each transmit control queue further including:
a positive transmit queue,
a negative transmit queue, and
an extreme negative transmit queue, the positive transmit queue having a higher selection priority than the negative transmit queue, the negative transmit queue having a higher selection priority than the extreme negative transmit queue; and
a first credit count threshold between the positive transmit queue and the negative transmit queue equals zero; and
a second credit count threshold between the negative transmit queue and the extreme negative transmit queue equals a negative of a maximum transmit unit for the communication network; and assigning each eligible child to one of the plurality of transmit control queues, each eligible child having a credit state meeting the credit count requirement for its assigned transmit control queue;

selecting at least one eligible child for dequeuing according to the priority level of the transmit control queue corresponding to the eligible child;

adding credits to the credit balance corresponding to an amount of data dequeued; and wherein each eligible and enabled child is represented in one of the transmit control queues.

16. The method of claim 15, wherein the transmit control queues further include an extreme positive transmit queue and a bypass queue:

the extreme positive transmit queue having a higher priority level than the positive transmit queue, the negative transmit queue, and the extreme negative transmit queue; and the bypass queue having a highest priority level and wherein the transmission from the bypass queue does not return credits to the credit balance.

17. The method of claim 15, wherein the transmit control queues further include an unknown child queue, the unknown child queue containing an eligible child activated by a parent scheduler before absorption into a credit state of a current scheduler.

* * * * *

UNITED STATES PATENT AND TRADEMARK OFFICE
CERTIFICATE OF CORRECTION

| | | |
|---|---|---|
| PATENT NO. | : 7,995,597 B2 | Page 1 of 1 |
| APPLICATION NO. | : 12/250681 | |
| DATED | : August 9, 2011 | |
| INVENTOR(S) | : Bradley D. Venables | |

It is certified that error appears in the above-identified patent and that said Letters Patent is hereby corrected as shown below:

In the Claims

Column 15, line 37, Claim 6, after the word "wherein" add --if--.

Column 16, line 62, Claim 14, after the word "wherein" add --if--.

Column 18, line 10, Claim 15, replace "adding credits to the credit balance" with --adding credits to a credit balance--.

Signed and Sealed this
Fourth Day of November, 2014

Michelle K. Lee
*Deputy Director of the United States Patent and Trademark Office*